United States Patent [19]

Herzhoff et al.

[11] 4,095,063
[45] June 13, 1978

[54] DETECTION DEVICE FOR PAPER OR FILM IN WEB FORM

[75] Inventors: Peter Herzhoff, Leverkusen; Hans Gref, Cologne; Wolfgang Schweicher, Leverkusen, all of Germany

[73] Assignee: Agfa-Gevaert Aktiengesellschaft, Leverkusen, Germany

[21] Appl. No.: 664,497

[22] Filed: Mar. 8, 1976

[30] Foreign Application Priority Data

Mar. 11, 1975 Germany .............................. 2510451

[51] Int. Cl.² ......................................... B65H 25/14
[52] U.S. Cl. ................................ 200/61.13; 19/0.24; 73/159; 118/8
[58] Field of Search .................. 118/8, 9, 11; 226/45; 26/17; 200/61.13; 73/159; 19/0.23, 0.24; 192/127

[56] References Cited

U.S. PATENT DOCUMENTS

| 2,836,668 | 5/1958 | Remington | 200/61.13 |
| 2,960,731 | 11/1960 | Hogg, Jr. et al. | 200/60.13 X |
| 3,301,974 | 1/1967 | Hancock | 26/17 X |
| 3,680,529 | 8/1972 | Francis | 118/9 X |
| 3,763,483 | 10/1973 | Urmenyi | 200/61.13 X |
| 3,796,094 | 3/1974 | Cook et al. | 73/159 |
| 3,842,668 | 10/1974 | Lippke | 200/61.13 X |

Primary Examiner—John P. McIntosh
Attorney, Agent, or Firm—Connolly and Hutz

[57] ABSTRACT

The device for detecting local thickening in webs of paper or film is based on the fact that the thickenings are first mechanically sensed and the mechanical sensing is converted by simple means into an electrical signal. The arrangement consists basically of a stationary roller over which the web to be examined is guided and a pivotal sensor roller mounted at a narrow interval from the guide roller. The sensor roller is mounted on two separate pivotal levers and rotates at the same speed as, but in the opposite direction to, the guide roller. The pivotal levers are provided with stops which determine a gap between the guide roller and the sensor roller through which the web is guided. The stops are in the form of contact switches through which the same electrical current successively flows, so that the flow of current is temporarily interrupted when one or both stops is lifted off its support when a thickening passes through the gap.

5 Claims, 4 Drawing Figures

DETECTION DEVICE FOR PAPER OR FILM IN WEB FORM

This invention relates to a device for mechanically detecting local thickenings or knots in webs of paper or film.

In the production of photographic materials (black-and-white and colour), a paper web is coated with photographic emulsion and then dried. In the coating machines used, the webs are generally guided through a very narrow coating gap. Local thickenings or knots in the web are unable to pass through the coating gap beyond a critical thickness. The web is thus stopped and tears, in some cases completely. This results in expensive production stoppages and in the loss of the entire length of web (several hundred square meters) present in the dryer.

The knots or thickenings are formed in preceding production stages and, despite preventive measures, cannot be completely avoided. They are caused by partially dried baryta beads up to about 1 mm in diameter which, in the baryta machines, are transferred uncontrollably from coating brushes to the freshly baryta-coated web and adhere very firmly to it. In the case of polyethylene-lined webs, thickenings are caused by local disturbances in extrusion during coating of the paper web with polyethylene. The thickenings are of substantially the same size as the baryta knots referred to above.

Electro-optical scanning systems based on the different reflectivity of the faults are already known, in which a beam is reflected from the web and electronically evaluated. The electronic evaluating circuit is generally complicated and expensive. In addition, the change in reflectivity caused by the above-mentioned knots and thickenings is very small, which makes them difficult to detect by electro-optical scanning.

The object of the present invention is to provide a detection device which mechanically detects local changes in thickness in the web and causes the critical narrow gaps in the coating machines to be briefly widened. Importance is attached to a simple and robust construction. Another important requirement is that the detection device should not normally come into contact with the surface of the web in the absence of faults.

According to the invention there is provided a device for mechanically detecting local thickenings in a web, comprising a guide roller; a sensor roller arranged with its axis of rotation parallel to the guide roller and mounted on a pair of pivotal levers for movement away from the guide roller; a stop provided on each pivotal lever and engageable with a support to determine a minimum gap between the guide roller and the sensor roller through which in use the web is guided, each stop and its associated support forming an electrical contact switch; and an electrical circuit including both contact switches and a source of electrical power, the circuit being such that the flow of current is temporarily interrupted when one or both stops is lifted off its respective support when a thickening passes through the gap.

The stops are advantageously in the form of gauge blocks and determine the gap according to the minimum thickness of the faults (thickenings) to be detected. The detection device may thus readily be changed over to a web of a different thickness. For this purpose, the gauge blocks simply have to be replaced by other blocks.

In one preferred embodiment of the invention, the weight of the sensor roller is partly compensated. To this end, the two levers in which the sensor roller is mounted each have two arms and are provided with tension springs at their ends. The tension springs counteract the weight of the sensor roller. A pulse shaper may be connected into the circuit which is formed by the two stops acting as switches. In the event of a temporary interruption in the flow of current, the pulse shaper generates a standardised control signal which causes the coating blocks following the detection device to drop down. In the context of the invention, "standardised" means that the brief signal impulse governed by the shape of the thickenings and the rate of travel of the web is converted into a control impulse of constant length and amplitude. It has surprisingly been found that a detection device of this kind has an extremely high sensitivity, even in the case of relatively wide webs, and that its sensitivity is substantially constant over the entire width of the web. Knots or thickenings as small as 0.05 mm can be detected. One particular advantage is that the lower response limit can be adapted to meet particular requirements by varying the width of the gap. In practice, the gap width is selected in such a way that only thickenings or knots which are unable to pass through the following coating machines are indicated. The detection device normally does not involve any contact, i.e. the sensor roller does not come into contact with the surface of the web to be investigated unless a sufficiently large knot or thickening occurs.

The detection device has the further advantage that it is simple and compact in structure and can be constructed with few electronic components.

One exemplary embodiment of the invention is described below with reference to the accompanying drawings, wherein.

Figure 1:
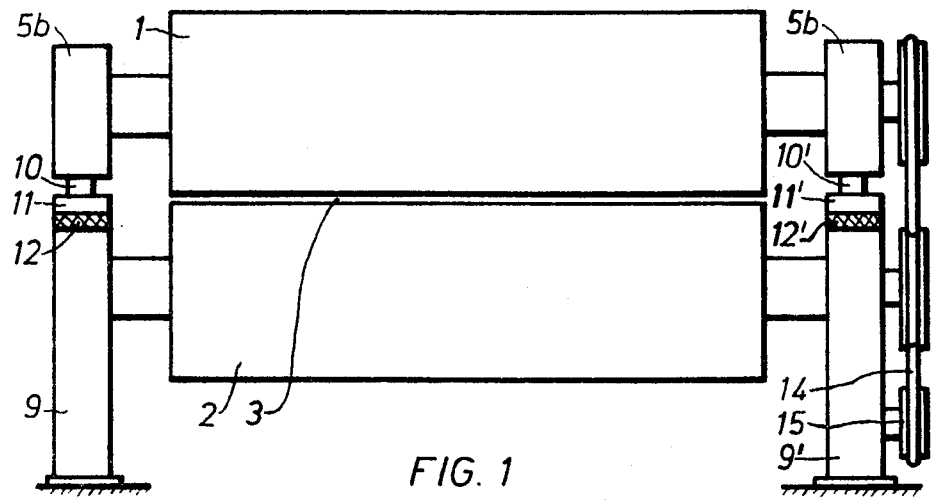
FIG. 1 is a front view of the detection device.

As shown in FIG. 1, the detection device comprises two axially parallel rollers 1 and 2 which are arranged at a calibrated distance one above the other and whose outer surfaces define between them a measuring gap 3. A web 4 to be examined is looped partly around the lower roller 2 whose axis is fixed (cf. FIG. 2). The upper roller 1 acts as a sensor roller and does not come into contact with the web 4 as long as there are no faults in the web.

Figure 2:
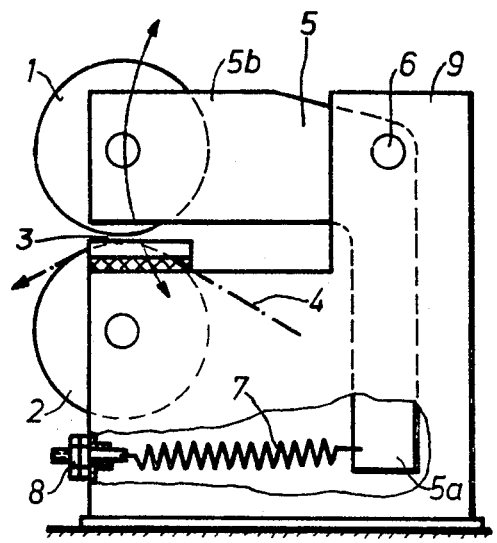
FIG. 2 is a side elevation of the detection device.

The roller 1 is mounted on two-armed, right-angled toggle levers 5 which are each pivotal about a pivot 6 (FIG. 2). It is important for the levers 5 not to be fixedly connected to one another. The torque applied by the weight of the sensor roller 1 is partly compensated by tension springs 7. One end of each spring 7 is attached to a fixed adjusting screw 8, whilst the other end is fastened to the free arm 5a of the toggle lever 5. Accordingly, the weight of the sensor roller 1 may largely be compensated through adjustment of the adjusting screws 8. The toggle levers 5 and the bearings for the guide roller 2, together with the adjusting screws 8, are arranged on lateral panels 9 and 9'. The lateral panels 9 and 9' are also used for mounting the detection device in the web guide path of a coating machine.

The width of the measuring gap 3 is adjusted by replaceable gauge blocks 10 and 10' which, together with supports 11 and 11', form a stop for the upper arms 5b of the toggle levers 5. The gap width is adapted to the thickness of the web 4 to be examined by selecting gauge blocks 10 of an appropriate size. The gap width is governed by the relation $$s = d + \Delta,$$

where $d$ is the thickness of the web and $\Delta$ the minimum thickness of the unacceptable thickenings.

In practice, a set of gauge blocks 10 and 10' is kept ready, the length of the gauge blocks corresponding to the thickness of the webs to be examined.

The supports 11 and 11' are steel plates which are electrically insulated with respect to the side panels 9 and 9' by an insulated intermediate layer 12 and 12'. The gauge blocks 10 and 10' acting as stops and the steel plates 11 and 11' thus represent two contact switches which are normally closed. If a knot with the thickness $D \geq \Delta$ passes through the gap 3, the sensor roller 1 and, hence, at least one of the two stops (gauge blocks 10 and 10') are raised. As a result, at least one of the two contacts 10, 11 and 10', 11' is temporarily opened. The stops 10 and 10' and the steel plates acting as supports 11 and 11' thus behave in the manner of electrical switches 13, 13' (see FIG. 4) which are normally closed and open temporarily in the presence of a fault in the web.

Figure 3:
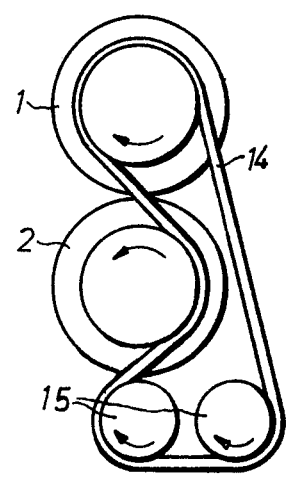
FIG. 3 shows the drive of the sensor roller of the detection device.

The sensor roller 1 rotates at the same peripheral speed as, but in the opposite direction to, the guide roller 2. The sensor roller 1 is driven by an endless belt which is looped around the sensor roller 1 and the guide roller 2 and guided over the guide rollers 15 and 15' (see FIG. 3). In the absence of rotation, the web is in danger of tearing under the shear load when a knot or thickening in the web passes through the measuring gap 3.

Figure 4:
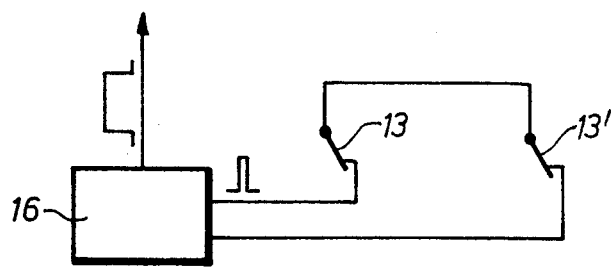
FIG. 4 shows the circuit diagram of the detection device.

The electrical circuit for detecting faults in the web is extremely simple (see FIG. 4). The two contact switches 13 and 13' are connected in series, in other words the same current flows through each of them. Accordingly, it is sufficient for one of the two stops (gauge blocks) 10 and 10' to be lifted off the supports 11 and 11' in order to interrupt the flow of current. The temporary break in current corresponds to a pulse which is delivered to a pulse shaper 16. The pulse shaper 16 may consist, for example, of a monostable multivibrator and generates a standardised current pulse of fairly long duration which may be used for control and regulating purposes. In use the web 4 to be examined travels through the detection device and then through one or more coating machines in which the web is coated with photographic emulsion. Coating machines of this kind are described in detail in the literature, for example in U.S. Pat. Nos. 2,761,419, 2,761,791 and 3,413,143. In such coating machines, the web is guided through a narrow coating gap between a coating block and the coating roller. The coating block may be swung down by hand or by means of electrical motors. As already described, the narrow coating gaps give rise to the danger of tears being formed in the web when thickenings or knots are present in it.

In the detection device, the surface of the web to be examined passes normally without contact through the measuring gap 3 between the sensor roller 1 and the guide roller 2. It is only a knot or a thickening in the web which results in local contact of the sensor roller 1. If this occurs, the sensor roller 1 is swung upwards with the toggle lever 5 about the pivot 6, so that the gauge block 10 or 10' or even both gauge blocks are lifted off the steel plates 11, 11'. This means that at least one of the two contact switches 13 and 13' opens. Because they are connected in series, a pulse is formed at the input of the pulse shaper 16, its length being governed by the dimensions of the knot or thickening in the web and by the rate of travel of the web. The circuit formed by the two contact switches 13, 13' naturally contains a voltage source which has been omitted in the interests of clarity. The pulse arriving at the pulse shaper 16 is generally too short to be directly used as a control pulse. For this reason, the pulse is lengthened and, if necessary, also amplified in the pulse shaper 16. The output pulse may then control, for example, the following coating machines through a suitable retarding device in such a way that the coating gaps are successively enlarged for a brief interval when the detection device has indicated the presence of a thickening or a knot which exceeds the tolerance limit $\Delta$. In other words, in the event of a fault, the detection device causes the following coating machines to drop down successively in time so that the thickening or the knot is able to pass through all the coating blocks without any tears being formed in the web. As a result, however, a certain length of the web remains uncoated. Accordingly, the web contains an uncoated zone. However, the uncoated zone may readily be eliminated during further processing and by comparison with a tear involves much less cost.

What is claimed is:

1. A device for mechanically detecting local thickenings in a web, comprising a guide roller; a sensor roller arranged with its axis of rotation parallel to the guide roller and mounted on a pair of pivotal levers for movement away from the guide roller; a stop provided on each pivotal lever and engageable with a support to determine a minimum gap between the guide roller and the sensor roller through which in use the web is guided, each stop and its associated support forming an electrical switch; an electrical circuit including both switches and a source of electrical power, the circuit being such that the flow of current is temporarily interrupted when one or both stops is lifted off its respective support when a thickening passes through the gap, drive means for the guide and sensor rollers which are constructed and arranged for driving the rollers in directions counter-current to each other whereby their direction of travel in portions adjacent the web corresponds to the direction of the web, and are substantially equal in surface speed, whereby tearing of the web is prevented when a local thickening in the web passes between the rollers and opens the electrical circuit.

2. A device as claimed in claim 1, wherein the stops are in the form of replaceable precision gauge blocks having discrete dimensions and determine the gap according to the minimum thickness of the thickenings to be detected.

3. A device as claimed in claim 1, wherein each of the levers has two arms, one arm of each lever carrying the sensor roller and tension springs acting on the other ends of the levers to support the weight of the sensor roller.

4. A device as claimed in claim 1, wherein the circuit includes a pulse shaper adapted to convert a signal pulse formed in the event of a temporary break in the current into a standardised control pulse capable of causing a coating arrangement of a coating machine to become inoperative.

5. A device as set forth in claim 1, wherein the drive means comprises an endless belt and pulley arrangement connecting the guide and sensor rollers to rotate in directions opposite to each other at the same speed.

* * * * *